United States Patent
Adamietz et al.

(10) Patent No.: US 6,814,550 B1
(45) Date of Patent: Nov. 9, 2004

(54) VACUUM PUMP WITH VIBRATION ABSORBER

(75) Inventors: Ralf Adamietz, Wermelskirchen (DE); Christian Beyer, Köln (DE); Heinrich Engländer, Linnich (DE); Dieter Götz, Köln (DE)

(73) Assignee: Leybold Vakuum GmbH, Cologne (DE)

( * ) Notice: Subject to any disclaimer, the term of this patent is extended or adjusted under 35 U.S.C. 154(b) by 64 days.

(21) Appl. No.: 10/181,189

(22) PCT Filed: Nov. 4, 2000

(86) PCT No.: PCT/EP00/12336

§ 371 (c)(1),
(2), (4) Date: Oct. 7, 2002

(87) PCT Pub. No.: WO01/51817

PCT Pub. Date: Jul. 19, 2001

(30) Foreign Application Priority Data

Jan. 15, 2000 (DE) .......... 100 01 509

(51) Int. Cl.[7] .............................. F04B 35/00
(52) U.S. Cl. ............. 417/363; 417/423.4; 415/90
(58) Field of Search ........... 417/363, 423.4; 415/90

(56) References Cited

U.S. PATENT DOCUMENTS

| 3,000,389 A | | 9/1961 | Alsaget et al. |
| 4,352,643 A | * | 10/1982 | Iijima .......... 417/363 |
| 4,539,822 A | * | 9/1985 | Sundquist ......... 62/55.5 |
| 4,659,117 A | | 4/1987 | Holzhausen et al. |
| 4,833,899 A | * | 5/1989 | Tugal ............ 417/363 |
| 4,862,697 A | * | 9/1989 | Tugal et al. ....... 417/363 |
| 5,376,799 A | * | 12/1994 | Schamber et al. .. 250/441.11 |
| 5,662,456 A | | 9/1997 | Engländer |
| 6,575,713 B2 | * | 6/2003 | Ohtachi et al. ..... 417/363 |

FOREIGN PATENT DOCUMENTS

| DE | 3239328 A1 | 4/1984 | |
| DE | 3537822 C2 | 4/1987 | |
| DE | 9304435 U1 | 6/1993 | |
| DE | 4314419 A1 | 11/1994 | |
| DE | 19804768 A1 | 8/1999 | |
| EP | 220581 | 5/1987 | |
| GB | 2129068 | 10/1984 | |
| JP | 56038598 | 4/1981 | |
| JP | 56038598 A1 * | 4/1981 | ........ 415/119 |
| JP | 56092396 | 7/1981 | |
| JP | 61294191 | 12/1986 | |
| JP | 2002295581 A * | 10/2002 | ........ 415/90 |

\* cited by examiner

*Primary Examiner*—Cheryl J. Tyler
(74) *Attorney, Agent, or Firm*—Fay, Sharpe, Fagan, Minnich & McKee, LLP

(57) ABSTRACT

A vacuum pump (1) includes a housing (2) in which a suction inlet opening (5) is defined. A vibration absorber (7) includes a suspension body (8) and an absorber jacket (9). The housing (2) of the vacuum pump (1) is connected directly to one end of the suspension body (8) in vacuum-tight connection and an opposite end of the suspension body carries a connecting port (14). By connecting the suspension body directly with the housing without mechanically releasable interconnection elements, the overall height of the pump and suspension body assembly is reduced.

10 Claims, 2 Drawing Sheets

VACUUM PUMP WITH VIBRATION ABSORBER

BACKGROUND OF THE INVENTION

The present invention relates to a vacuum pump that comprises a housing that is provided with an inlet opening, and a vibration absorber that consists of a suspension body being encompassed by an absorber jacket.

In vacuum pumps, vibrations of the components, like rotating components for example, effecting pumping of the gases can not be entirely avoided. It is therefore known to employ vibration absorbers if a vacuum pump of this kind needs to be connected to sensitive instrumentation, like electron microscopes, analytical equipment or alike. Known vibration absorbers exhibit a vacuum-tight suspension body, for example a bellows section made of stainless steel which is encompassed by an absorber jacket made of an elastomer material. Both face sides of the suspension body are equipped with one flange each. In the fitted state one of the flanges is joined to the inlet flange of the vacuum pump; the second flange is joined to the corresponding flange on the instrument connected in each instance.

Of disadvantage is the fact that the usage of known vibration absorbers results in a relatively great overall height of the system, in particular when axially pumping vacuum pumps, turbomolecular pumps for example, are involved.

It is the task of the present invention to reduce the overall height of an evacuation system of the aforementioned kind.

SUMMARY OF THE INVENTION

This task is solved by the present invention through the characterising features of the patent claims.

Already direct joining—by welding, for example—the delivery side of the suspension body to the casing of the vacuum pump will result in a reduced overall height of the entire system since one pair of flanges may be omitted. If, however, the inside dimension of the suspension body exceeds the outside diameter of the vacuum pump's casing, then there exists the possibility of reducing the overall height even further by arranging the vibration absorber so that it encompasses the vacuum pump's casing.

One advantage of the present invention is that it reduces the overall height of an evacuation system.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
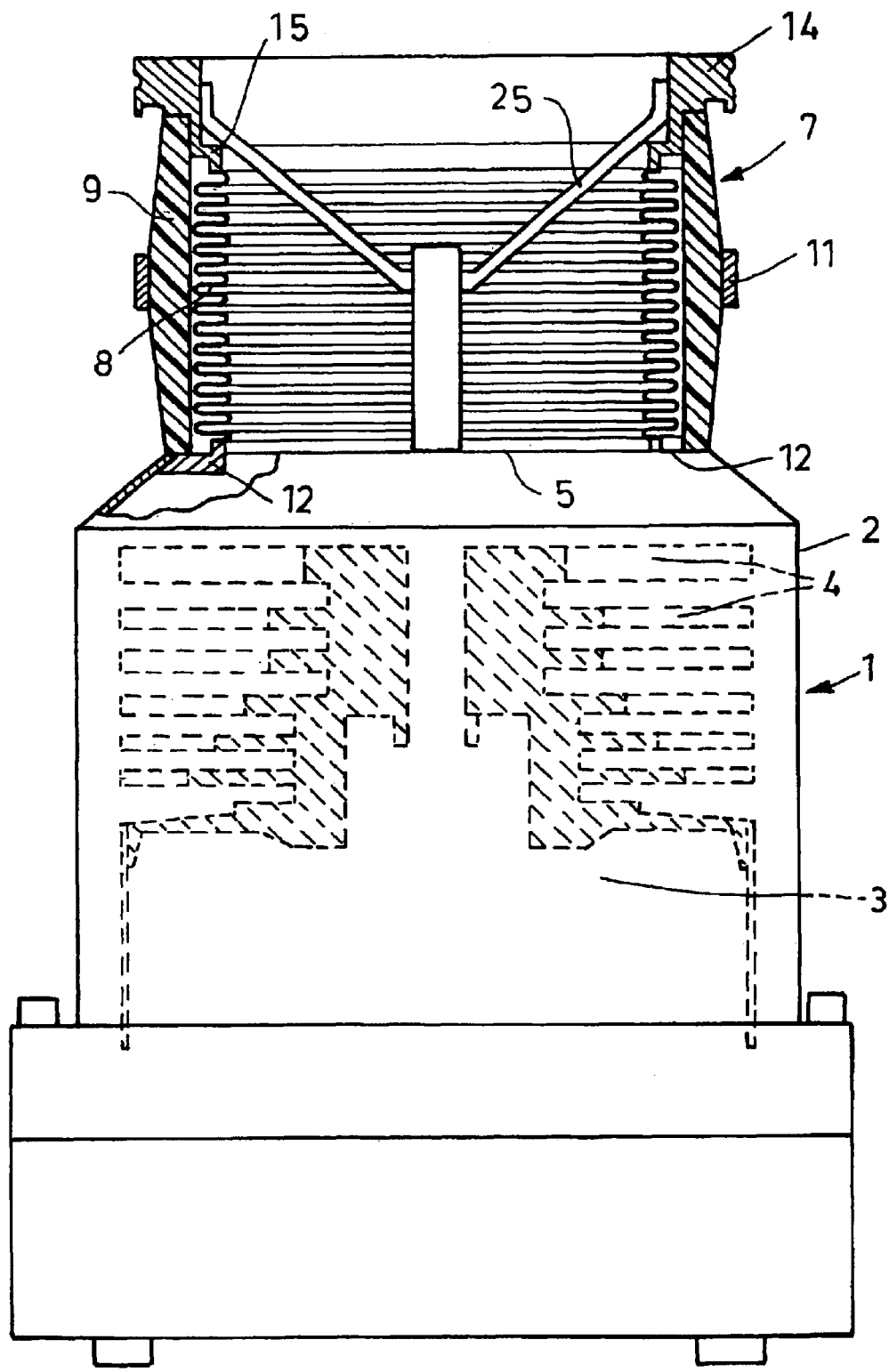
FIG. 1 is a side view in partial section of a turbomolecular pump equipped with a vibration absorber in accordance with the present invention.

As an example for a vacuum pump, a turbomolecular pump 1 has been selected for both embodiments, the casing of said turbomolecular pump being designated as 2. Of the turbomolecular pump 1 only the silhouette of the casing 2 is chiefly visible; only a part of the rotating system 3 with its rotor blades 4 is depicted by dashed lines. Located on the suction side of the casing 2 of pump 1 is an inlet opening 5 at the face side; an outlet is not depicted.

The vacuum pump 1 is equipped with a vibration absorber 7. This absorber includes a suspension body 8 encompassed by the absorber jacket 9. The absorber jacket 9, in turn, is equipped on its outside with a reinforcement ring 11 designed to protect the absorber material subjected to pinching, against radial flexing in response to the load, respectively, to affix the axially guided absorber jacket 9 on the suspension body 8.

In the design example in accordance with drawing FIG. 1, the rim 12 of the casing 2 of the turbomolecular pump 1, said rim encompassing the inlet opening 5, is directly welded to the suspension body 8. The dimensions have been selected in such a manner that the absorber jacket 9 also encompassing the suspension body 8 is supported on the rim 12 of the inlet opening 5. On the suction side, the suspension body 8 carries the inlet flange 14. This flange has an inner rim 15 which is welded to the face side of the suspension body 8 on the suction side. The absorber jacket 9 is supported by the flange 14.

Since in the embodiment according to drawing FIG. 1 the flange pair necessary according to the state-of-the-art between casing 2 of the vacuum pump 1 and the vibration absorber 7 is omitted, already now a reduction in the overall axial height of the evacuation system consisting of vibration absorber 7 and pump 1 is attained.

Figure 2:
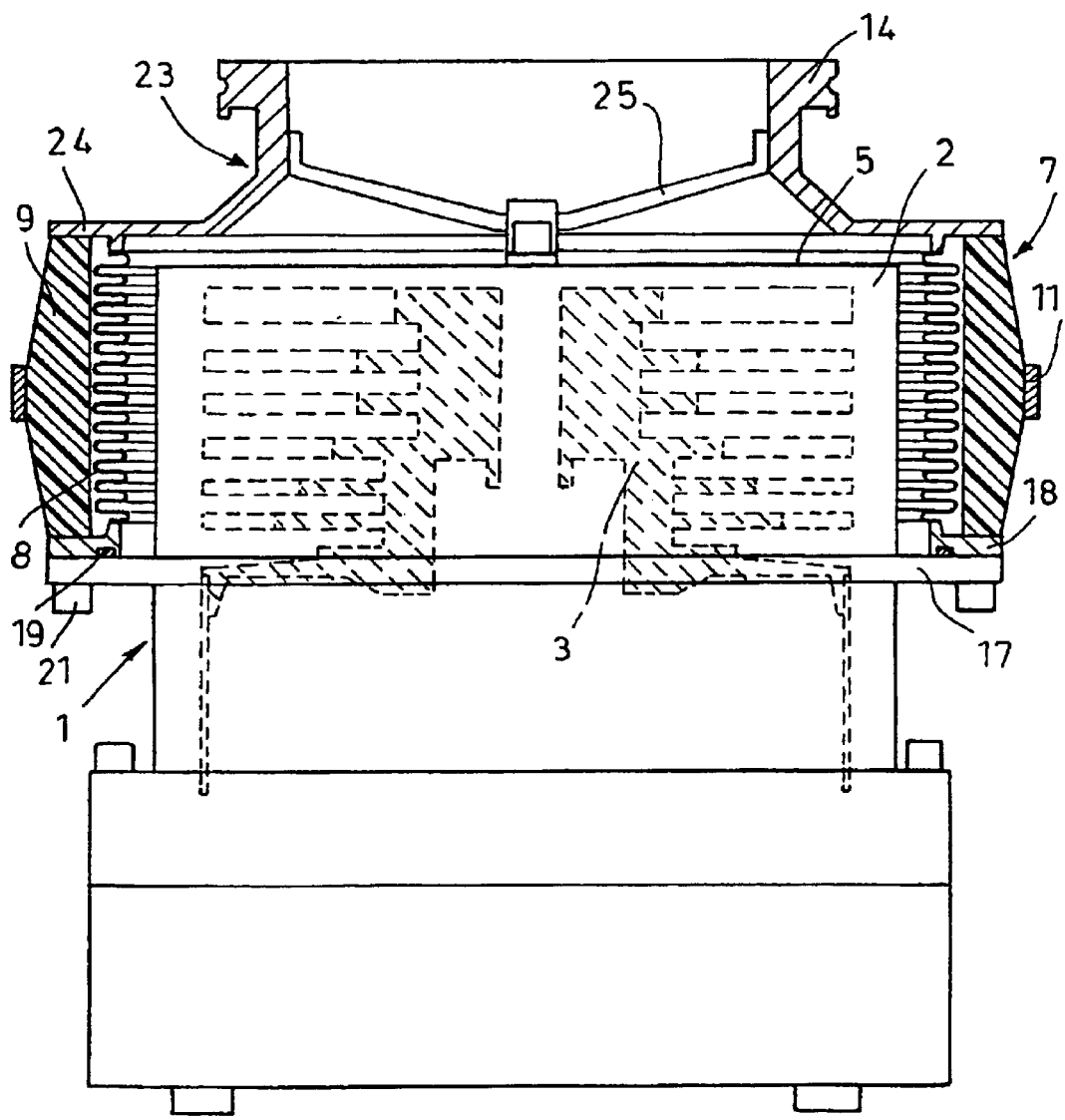
FIG. 2 is a side view in partial section of a turbomolecular vacuum pump in combination with another embodiment of a vibration absorber in accordance with the present invention.

In the design example in accordance with drawing FIG. 2, the casing 2 of the turbomolecular pump 1 is equipped with a circumferential ring 17. It is so arranged that its distance from the inlet opening 5 approximately corresponds to the height of the suspension body 8. The inside diameter of the suspension body 8 is somewhat larger than the outside diameter of the casing 2. Thus it is possible to join, in a vacuum-tight manner, the face side of the suspension body's delivery side 8 to the ring 17 firmly attached to the casing. To this end, the suspension body 8 is welded to the inner rim of a flange 18 which in turn is joined in a vacuum-tight manner to the circumferential rim 17 (sealing ring 19, screw fitting 21). Of course the components 17 and 18 might also be welded together. The absorber jacket 9 is supported by the flange 18.

On the suction side, the suspension body carries the flange 14. It is equipped with a reducing section 23, which on the delivery side has a radially extending rim 24. Said rim is welded to the suspension body 8. Moreover, it supports the absorber jacket 9.

Since in the embodiment in accordance with drawing FIG. 2 the vibration absorber 7 encompasses the casing 2 of the vacuum pump 1 almost along its entire height, a drastic reduction in the total height is attained compared to the state-of-the-art.

In the two embodiments (drawing FIGS. 1, 2) the vibration absorber 7 is equipped with a basically known stroke limiter 25. Braces joined to the flange 14 prevent the transfer of inadmissibly high loads to the suspension bodies 8, for example by to great an expansion owing to the weight of the pump when the pressure between inside and outside is equalised.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. The A vacuum pump comprising:
   a housing provided with an inlet opening; and
   a vibration absorber including:
      a suspension body, the housing of the vacuum pump being directly joined to one side of the suspension body and an opposite side of the suspension body carrying a connecting port, an inner diameter of the suspension body being greater than a diameter of the housing of the vacuum pump, the suspension body being joined to the housing of the vacuum pump in such a manner, that said suspension body encompasses the housing at least section-wise, and
      an absorber jacket connected between the housing and the connecting port.

2. The vacuum pump according to claim 1, wherein
   the housing has a circumferential ring; and
   a delivery side of the suspension body is joined to said ring in a vacuum-tight manner.

3. The vacuum pump according to claim 2, wherein the delivery side of the suspension body is welded to a flange which in turn is joined to the circumferential ring in a vacuum-tight manner.

4. The vacuum pump according to claim 3, wherein the absorber jacket is supported by the flange.

5. The vacuum pump according to claim 1, wherein the connecting port includes:
   a reducing section with a radially extending rim which is welded to the suspension body and which is supported the absorber jacket.

6. A vacuum pump according to claim 1, wherein the comprising:
   a housing provided with an inlet opening; and
   a vibration absorber is equipped with a stroke limiter, the vibration absorber including:
      a suspension body, the housing of the vacuum pump being directly joined to one side of the suspension body and an opposite side of the suspension body carrying a connecting port, and
      an absorber jacket extending between the housing and the connecting port.

7. The vacuum pump according to claim 6, wherein a rim encompasses the inlet opening and is welded to the one side of the suspension body at a suction side.

8. The vacuum pump according to claim 7, wherein the absorber jacket is supported by the rim.

9. A vacuum pump comprising:
   a housing;
   a suction inlet opening defined in the housing;
   a flange connected with the housing in a vacuum tight relationship;
   a flexible suspension body connected with the flange in a permanent, vacuum tight relationship;
   a connecting port connected with the flexible suspension body in a vacuum tight relationship; and,
   absorber jacket extending between the flange and the connecting port and extending peripherally around the flexible suspension member;
   a stroke limiter connected with the connection port and extending into the flexible suspension body.

10. The vacuum pump according to claim 9 wherein the flange is connected with the housing one of:
   contiguous to and peripherally surrounding the suction inlet opening such that the suspension body and the vibration absorber jacket extend from the housing adjacent the suction inlet opening; and,
   around a periphery of the housing displaced from the suction inlet opening with the suspension body and the vibration absorber jacket extending peripherally around the housing and the connection port disposed adjacent and displaced from the suction inlet opening.

* * * * *